(12) United States Patent
Loughran

(10) Patent No.: US 6,408,074 B1
(45) Date of Patent: Jun. 18, 2002

(54) HARDWARE ARCHITECTURE FOR A CONFIGURABLE CIPHER DEVICE

(75) Inventor: Kevin Loughran, Randolph Township, Morris County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/177,693

(22) Filed: Oct. 22, 1998

(51) Int. Cl.[7] .................................................. H04L 9/06
(52) U.S. Cl. ............................ 380/28; 380/29; 380/37; 713/189
(58) Field of Search ............................. 380/28, 29, 43, 380/271, 277, 30, 37; 713/189

(56) References Cited

U.S. PATENT DOCUMENTS

| | | | | |
|---|---|---|---|---|
| 4,731,843 A | * | 3/1988 | Holmquist | 380/29 |
| 4,914,697 A | * | 4/1990 | Dabbish et al. | 380/28 |
| 4,972,478 A | * | 11/1990 | Dabbish | 380/28 |
| 5,185,796 A | * | 2/1993 | Wilson | 380/277 |
| 5,222,137 A | * | 6/1993 | Barrett et al. | 380/271 |
| 6,026,490 A | * | 2/2000 | Johns-Vano et al. | 380/28 |
| 6,282,291 B1 | * | 8/2001 | Kobayashi et al. | 380/43 |

* cited by examiner

Primary Examiner—Gilberto Barron, Jr.
Assistant Examiner—Steve Kabakoff
(74) Attorney, Agent, or Firm—Mendelsohn and Associates PC

(57) ABSTRACT

A cipher device that can be configured to execute different types of cryptographic algorithms and perform more than one algorithm simultaneously. The device is operated from an external source and is implemented with a hardware architecture which exhibits the efficiency of conventional hardware based cipher devices as well as the flexibility of software based solutions.

10 Claims, 3 Drawing Sheets

HARDWARE ARCHITECTURE FOR A CONFIGURABLE CIPHER DEVICE

BACKGROUND OF THE INVENTION

1. Field of the Invention

The present invention provides for a hardware based cipher device which is configurable to perform different cryptographic algorithms and in particular provides for efficient and flexible execution of these algorithms.

2. Description of the Related Art

The security of information conveyed over communication systems has always been a source of concern for those who provide communication services to subscribers, viz., system operators. With the growing use of communication systems such as the Internet and wireless communication systems (e.g., cellular communication), information security has become an important consideration for system operators. One of the more effective techniques used by communication system operators is to encrypt a user's information before such information is conveyed over a system. The intended receiver of the information is provided with the proper decryption equipment. The science and technology of keeping information secret from unauthorized parties by using a code or cipher is known as Cryptography, *Cryptography's Role In Securing The Information Society*, Kenneth W. Dam and Herbert S. Lin, Editors, National Academy Press 1996. In a basic form of Cryptography, the information is first encrypted and then transmitted over a communication system. Associated with the encryption applied to the information is a secret procedure or "key" that allows one to decrypt the encrypted information. The key is known only to the authorized recipient of the information and the system operator.

Cryptographic techniques are typically implemented with software or hardware based schemes. The software schemes typically make use of either digital computer equipment and/or digital signal processing equipment which are used to encrypt and/or decrypt information conveyed by an information source (e.g., a communication system, or any other system, communication device). The hardware schemes are typically achieved with specific hardware designed to execute various well known cryptographic operations (e.g., shift, add, multiply) on the information.

The digital signal processing equipment (e.g., digital signal processors) used for software based schemes typically comprise well known digital and analog circuits that process information (in the form of digital and/or analog signals) in accordance with a procedure that is typically implemented through software. The procedure performs cryptographic operations on the information in order to encrypt or decrypt the information; such a procedure is referred to as a cryptographic algorithm. The processing of information in accordance with a cryptographic algorithm is referred to as cryptographic processing. The signal processing hardware include such well known signal processing blocks as shift registers, binary adders, delay blocks and multiplier blocks. The various signal processing blocks are interconnected based on a specific set of instructions (i.e., software program) that is implementing a particular algorithm. The interconnections are implemented with any well known form of controllable electronic switches. Thus, the architecture of a Digital Signal Processor (DSP) is such that it can be programmed (interconnections between circuits) to achieve a specific type of processing based on the algorithm being implemented.

The digital computer equipment used for software based schemes typically comprise microprocessor based hardware and supporting digital logic circuitry. When the signal processing is implemented with a digital computer (i.e., a microprocessor based system), the algorithm is also implemented with a set of instructions. The individual signal processing blocks are implemented with software. Although the digital computer hardware or microprocessor hardware is not specifically designed to implement signal processing operations such as shift, add, delay and multiply, it is well known that these operations can be achieved with software.

Software implementation of cryptographic algorithms is desirable mainly because of the flexibility offered by such an implementation. In particular, different types of cryptography can be implemented with the same hardware; that is, the software for a particular algorithm simply has to be downloaded onto a computer or a DSP for implementation. Also, newly developed and accepted standard cryptographic algorithms can be easily implemented by simply making modifications to existing software or by writing new software. Further, because a DSP or a microprocessor-based system (e.g., a computer) does not contain hardware specially designed for cryptographic applications, the transportation logistics of such equipment is greatly simplified. Hardware associated with or designed for cryptographic technology are subject to rigorous U.S. government regulations. The U.S. federal government has passed laws that control the export and dissemination of cryptographic technology for various reasons including national security, protection of electronic commerce and the development of a globally accepted cryptographic standard, Dan & Lin, editors, *Cryptography's Role in Securing The Information Society*.

However, the computer equipment and/or signal processing hardware used in the software based schemes are inefficient in terms of speed of execution, power consumption, cost of manufacture and physical size. In particular, the signal processing hardware and computer equipment are typically general purpose integrated circuits (IC) which often contain circuitry that is not used or required in cipher applications. The general purpose ICs are usually in the form of relatively costly microprocessor or DSP ICs. These devices execute general purpose instructions to implement cryptographic algorithms. The mechanism for executing these instructions requires processing overhead which results in a decreased speed of execution compared to hardware designed specifically for cipher applications. The circuitry within such general purpose ICs is not specifically designed to perform cryptographic operations. Cryptographic schemes or techniques often make use of two or three predominant operations (e.g., shift, add, multiply) to execute cryptographic algorithms. The general purpose DSP and microprocessor ICs are thus inefficient in that significant portions of their internal circuitry are not used or are used relatively infrequently when executing cryptographic algorithms. When executing cryptographic algorithms part of the internal circuitry of these ICs is simply extraneous circuitry that consume power, take up space and contribute to the cost of the equipment within which they reside.

Hardware specifically designed to execute a particular algorithm or a class of algorithms may be relatively efficient in terms of physical size, cost, speed of execution, and power consumption, but they are not as flexible as the software schemes. A hardware device whose internal circuitry is specifically designed for a particular cryptographic algorithm or class of algorithms cannot be used for other algorithms.

What is therefore needed is a cipher device which exhibits the efficiency of hardware based implementations (from the perspective of speed of execution, cost, space and power consumption) and the flexibility associated with software implementation of cryptographic algorithms.

SUMMARY OF THE INVENTION

The present invention is a hardware architecture for a configurable cipher device device (hereinafter "cipher device") that performs various types of cryptographic algorithms. The cipher device is flexible in that it can be configured to perform a plurality of cryptographic algorithms (comprising different types of algorithms) simultaneously. Because the cipher device is tailored specifically for cipher applications, it has virtually no supporting circuitry and it is efficient in terms of speed of execution. The device is further designed to interface directly with and be controlled by an information source. The cipher device of the present invention contains virtually no extraneous circuitry and thus is efficient in terms of power consumption, size and cost of manufacture. Further, the cipher device of the present invention is configurable, and as such it has the flexibility to implement different types of cryptographic algorithms. The algorithms are downloaded onto the configurable device which is not specifically designed for any particular cryptographic algorithm and thus is not subject to rigid export laws.

In one embodiment of the present invention, the internal circuitry of the cipher device comprises configurable hardware such as Field Programmable Logic Arrays (FPLA) circuits or Application Specific Integrated Circuits (ASIC). Part of the configurable hardware is separated into algorithm blocks where each algorithm block is configured to perform a particular cryptographic algorithm. Each algorithm block comprises a plurality of individual circuits each of which performs a standard cryptographic operation such as shift, add and multiply. The individual circuits (e.g., shifter, adder, multiplier) can be interconnected with controllable internal switches to perform a particular algorithm. The interconnections are created through configurations (i.e., downloaded commands) that activate the internal switches thus configuring the algorithm blocks so that such blocks can perform cryptographic algorithms in an efficient manner.

The configurable architecture based cipher device of the present invention is coupled to an information source (e.g., data bus, communication channel, computer system) via an I/O path through which information including control information and control signals are conveyed. The device of the present invention is designed to receive and interpret control information and control signals from the information source allowing the information source to operate the device. The device of the present invention also generates control information and control signals that it transfers to the information source.

The cipher device of the present invention comprises at least one control circuit coupled to a configurable cipher circuit and at least one I/O interface circuit. The I/O interface circuit is further coupled to the configurable cipher circuit. The I/O interface circuit receives information and transfers said information to the configurable cipher circuit which performs cryptographic processing on the information and outputs the processed information to the I/O interface circuit.

DETAILED DESCRIPTION

Figure 1:
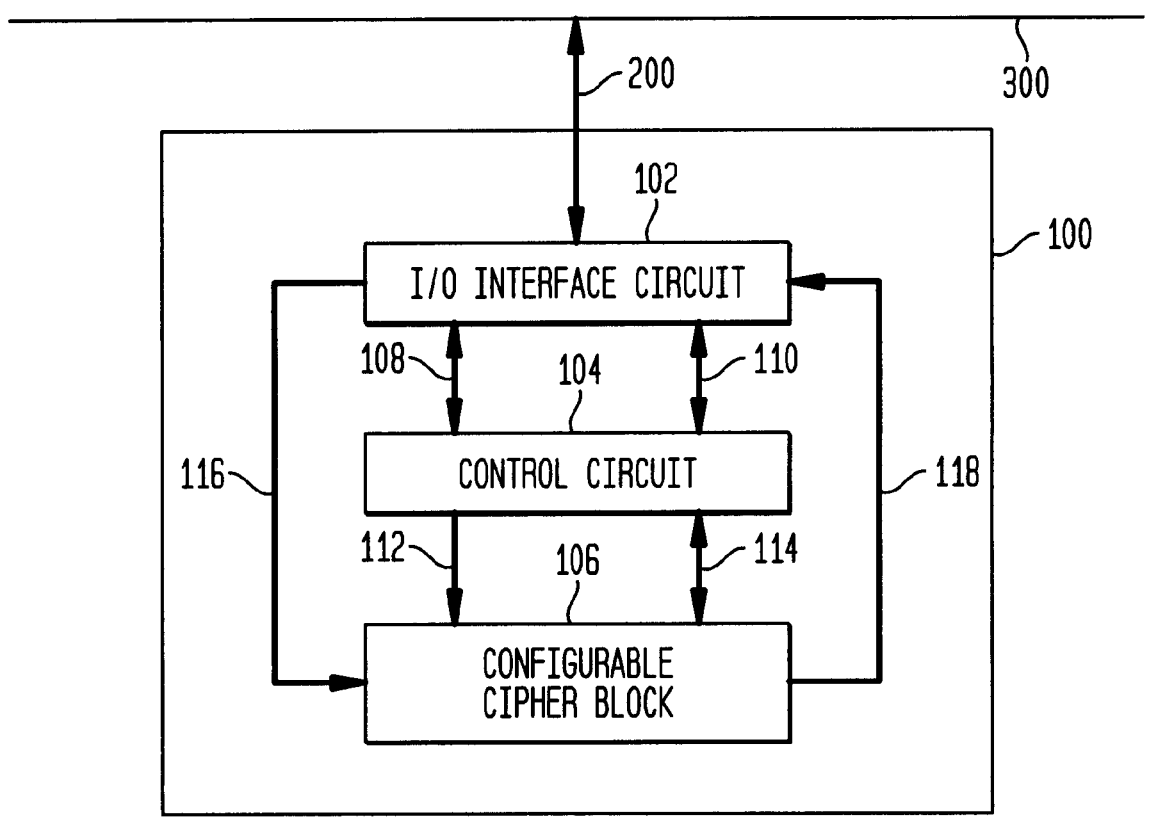
FIG. 1 is a block diagram of the present invention.

Referring to FIG. 1, there is shown a block diagram of configurable architecture based cipher device (hereinafter "cipher device") 100 of the present invention coupled to information source 300 via Input/Output (I/O) path 200. Cipher device 100 performs cryptographic processing on information it receives from information source 300 via I/O path 200 and outputs the processed information to information source 300. It should be noted that information source 300 is shown for illustrative purposes and does not form part of the cipher device (100) of the present invention. Cipher device 100 is flexible in that it comprises configurable hardware that allows it to perform different types of cryptographic algorithms based on configurations downloaded onto such hardware. Configurable hardware is a device or a plurality of devices whose individual construction and/or collective arrangement are controlled by configurations downloaded onto such hardware. The configurations are commands or instructions that can take the form of information represented by digital or analog signals. Cipher device 100 performs a plurality of cryptographic algorithms simultaneously. Cipher device 100 is efficient in terms of speed of execution, power consumption, physical size and cost of manufacture because its configurable hardware is tailored to cryptographic processing thus significantly reducing the existence of extraneous circuits within the device.

I/O path 200 of cipher device 100 is designed to convey (i.e., transmit and receive) information between cipher device 100 and information source 300. The information conveyed over I/O path 200 comprises encrypted information, decrypted information, information which has neither been encrypted nor decrypted (i.e., raw information), command information, status information and control signals. Command information and control signals are generated by both cipher device 100 and information source 300 which information and signals are used to operate and control cipher device 100. Thus cipher device 100 is configured to be operated by an information source virtually precluding any need for supporting circuitry. Supporting circuitry is any circuit or circuits external to cipher device 100 which are used to assist information source to operate and/or control the cipher device of the present invention. Status information and control signals are used to ascertain the status of cipher device 100. For example, status information 100 indicates whether cipher device 100 is performing cryptographic algorithms and if so, whether the algorithms being performed are encryption or decryption algorithms. Status information and control signals also indicates when a particular algorithm has been completed. The term "information" will hereinafter represent encrypted, decrypted or raw information.

Still referring to FIG. 1, Cipher device 100 further comprises at least one Control circuit (104) coupled to an I/O interface circuit (102) and a Configurable Cipher block (106). Configurable Cipher block 106 is further coupled to I/O interface circuit 102. Configurable Cipher block 106 receives command information and control signals routed through I/O interface circuit 102 and Control circuit 104 which command information and control signals allow Configurable Cipher block 106 to perform cryptographic processing on information received via I/O path 200, I/O Interface circuit 102 and path 116.

Path 116 is designed to allow information received by I/O interface circuit 102 to be transferred to Configurable Cipher block 106. Path 118 is designed to allow Configurable Cipher block 106 to transfer information to I/O Interface circuit 102. Thus, I/O interface circuit 102 is configured to convey (i.e., transfer and receive) information to Configurable cipher block 106. I/O interface circuit 102 is further designed to route information and/or command information received from information source 300 to either Control circuit 104 or Configurable cipher circuit 106. Command information received by I/O interface circuit 102 from information source 300 is routed to Control circuit 104 via path 108. Control signals received by I/O circuit 102 from information source 300 is routed to Control circuit 104 via path 110. Conversely, I/O interface circuit 102 receives status information from Control circuit 104 via path 108 and receives control signals from Control Circuit 104 via path 110. I/O interface circuit can be implemented with any well known combinatorial and synchronous logic circuits, analog circuits and/or programmable devices. The information, command information and status information can be in digital form and/or analog form.

Control circuit 104 is designed to operate and control configurable cipher block 106 allowing configurable cipher block 106 to perform cryptographic processing on information (on path 116). Control circuit 104 is designed to convey status information and control signals to I/O interface circuit 102. In particular, Control circuit 104 generates status information and control signals based on command information it receives from I/O interface circuit 102. Command information is received by Control circuit 104 over path 108 (108A; see FIG. 2). The status information is also based on control signals that Control circuit 104 receives from Configurable cipher circuit 106 via path 114. The generated status information is transferred to I/O interface circuit 102 via path 108 (108B; see FIG. 2). The generated control signals are transferred to I/O interface circuit 102 via path 110.

Control circuit 104 is further designed to convey command information and control signals to Configurable cipher block 106. In particular, Control circuit 104 generates command information based on command information it receives from I/O interface circuit 102 and control signals it receives from Configurable cipher block 106 (via path 114) and I/O interface circuit 104 (via path 110). The generated command information is transferred to Configurable cipher block 106 via path 112 (112B; see FIG. 2). Control circuit 104 can be implemented with any well known combinatorial and synchronous logic circuits, analog circuits and/or programmable devices arranged to generate control signals and command information based on other control signals and other command information.

Configurable cipher block 106 is configurable hardware whose internal circuitry is arranged by downloading configurations onto such hardware. The configurations originate from any storage device or system (e.g., information source 300) that is capable of downloading configuration commands (i.e., instructions, typically in digital form) onto configurable hardware. Examples of such hardware are FPLAs and ASICs. In particular, Configurable cipher block 106 comprises a plurality of configurable hardware units called algorithm blocks which can be configured to execute various types of cryptographic algorithms (encryption and/or decryption). The cryptographic algorithms are executed by the algorithm blocks which perform cryptographic operations on information provided via path 116 and transfer the result onto path 118. Thus, Configurable cipher block can be configured for different modes (e.g., encryption, decryption) of operation. One example of a mode of operation is a "no cipher" mode in which information (on path 116) associated with said mode is simply passed through to path 118 without being processed. When a particular algorithm block has finished performing its algorithm, it notifies Control circuit 104 of that event with a control signal via path 114. Control circuit 104 detects the control signal and generates status information and/or control signals which are transferred to I/O interface circuit 102. Information on path 116 are arranged and stored in I/O interface circuit 102 as groups of information or blocks of information which are to be processed in accordance with the command information and/or control signals associated with said information. The information is similarly arranged on path 118. More than one block of information can be transferred to configurable cipher block 106 at any one time. For example, a particular block of information can be transferred to a particular algorithm block within configurable cipher block 106. The flow of information associated with a particular block of information is referred to as an information stream. Thus, the cipher device of the present invention can process more than one information stream simultaneously. One example is where each information stream is associated with a communication channel of a communication system and each channel generates command information and control signals that dictate the type of processing (e.g. encryption, decryption) to be performed on its block of information. Command information, status information and control signals have a "tag" or identifier that indicates the block of information with which they are associated. In the example of a communication system, the "tag" may be a channel number that identifies the particular communication channel with which the block of information is associated. Other well known techniques for associating command information (or status information) and control signals to particular blocks of information can also be used.

Figure 2:
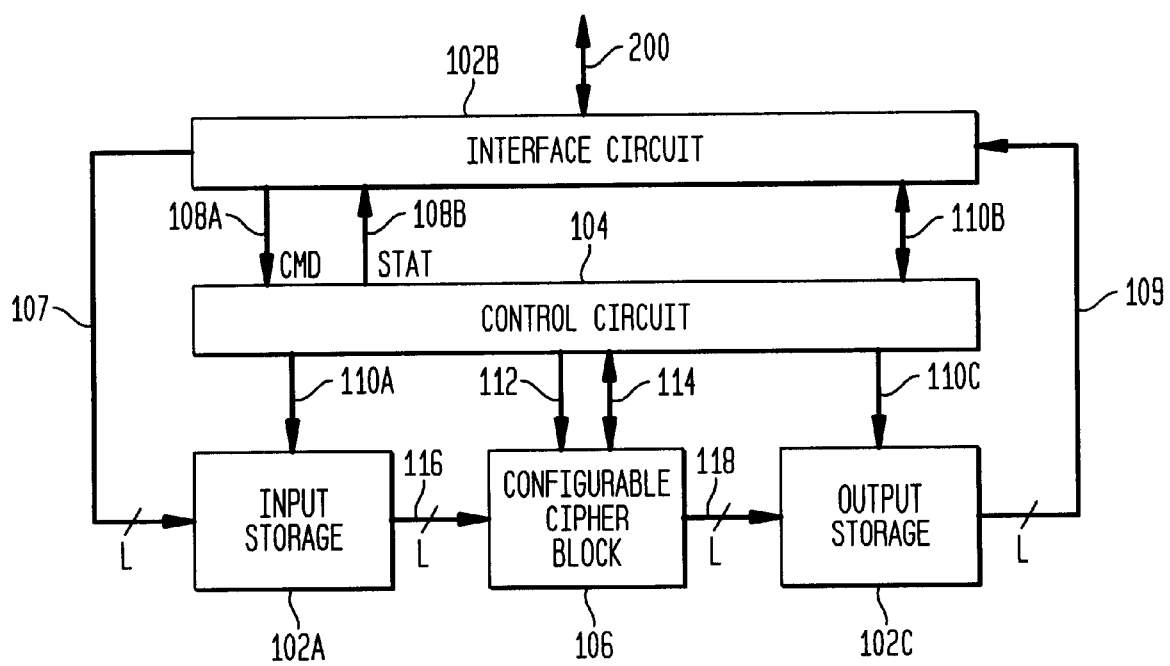
FIG. 2 is a more detailed block diagram of FIG. 1.

Referring now to FIG. 2 there is shown a more detailed diagram of cipher device 100. I/O interface circuit 102 comprises input storage 102A, output storage 102C and Interface circuit 102B. I/O interface circuit 102 is configured to convey (i.e., transfer and/or receive) information to Configurable cipher block 106. Storage 102A and 102C store input and output information respectively. The information is stored in any well recognized format used for information storage. The input and output storage can be implemented as storage circuitry for storing digital or analog signals. The input and output storage are controlled with control signals on paths 110A and 110C. Input storage 102A receives information from path 107 and transfers the information to path 116. Path 107 (as well as path 116) comprises L lines where L is an integer equal to or greater than 1. The L lines can be a digital bus through which digital information is conveyed. The L Lines are generally electrical, electronic or optical path for conveying information in the form of analog and/or digital signals. Configurable cipher block 106 outputs processed information onto path 118. Output storage 102C receives information from path 118 and transfers the information to interface circuit 102B via path 109 which also contains L lines (as well as path 118) and is constructed similarly to path 107.

Figure 3:
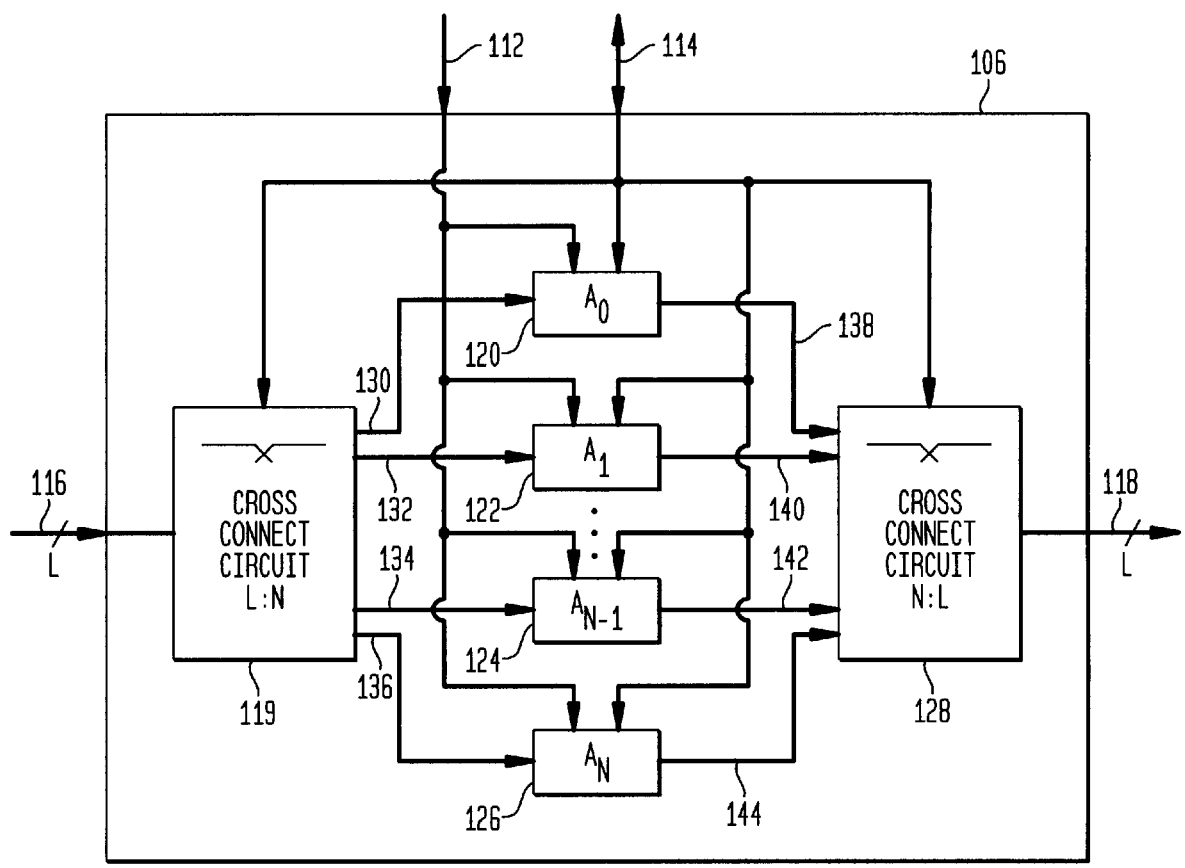
FIG. 3 is a detailed diagram of the configurable cipher block shown in FIGS. 1 & 2.

Referring now to FIG. 3, there is shown a block diagram of Configurable cipher block 106. Configurable cipher block 106 comprises algorithm blocks 120, 122, 124 and 126 onto which configurations are downloaded. The configurations are downloaded via configuration inputs (not shown) that route such configurations to the internal circuitry of the algorithm blocks causing said blocks to be configured for particular algorithms. The algorithm blocks are configurable hardware such as ASICs and FPLA circuits. The algorithm blocks are tailored for cryptographic processing significantly reducing extraneous circuits within the cipher device of the present invention. A tailored algorithm block contains the circuitry for performing the prevailing cryptographic operations (e.g., shift, add, delay) executed in a particular algorithm. The prevailing operations are the operations mostly performed during execution of a particular algorithm. Each algorithm block is configured independently from any other algorithm block. The algorithm blocks are configured (via configurations) into different types of algorithms or a class of algorithms depending on the application for which the device is being used. For example, when the cipher device of the present invention is used in a Groupe Speciale Mobile (GSM) wireless telecommunication system, the algorithm blocks are configured to execute a family of cryptographic algorithms known as the A5.x family of cryptographic algorithms. The A5.x algorithms currently comprise A5.1 and A5.2 algorithms.

Configurable cipher block 106 further comprises Cross connect circuits 119 and 128 both of which are coupled to the algorithm blocks. It should be noted that Configurable cipher block 106 is not limited to any particular number of algorithm blocks. In general, Configurable cipher block 106 comprises N algorithm blocks where N is an integer equal to or greater than 1. The algorithm blocks are coupled to path 112 for receiving command information from Control circuit 104. The command information transferred over path 112 comprise instructions generated by Control circuit 104, which instructions are transferred to the algorithm blocks to regulate and control the execution of the cryptographic algorithms. The algorithm blocks are also coupled to path 114 for receiving and transmitting control signals to and from Control circuit 104. The control signals regulate the timing of the algorithm blocks. For example, when an algorithm block has concluded executing a cryptographic algorithm it signals such an event by generating a control signal onto path 114 indicating that it is idle. More than one algorithm block can simultaneously perform cryptographic processing on one or more blocks of information. Cross connect circuit 119 is a circuit or device that is able to couple any one (or more) of L lines (on path 116) to any one (or more) of N algorithm block input paths (130, 132, 134, 136). Cross connect circuit 128 is able to couple any one (or more) of N algorithm block output paths (138, 140, 142, 144) to any one (or more) of L lines on path 118. Examples of cross connect circuits are well known circuits called multiplexers and/or demultiplexers.

Referring now to FIGS. 2 and 3, processing of information by cipher device 100 and, in particular by algorithm block $A_0$(120), is now discussed as an example. A particular block of information provided by information source 300 to cipher device 100 is caused to be routed to one of L lines of path 116 by control signals and command information also provided by information source 300. Cross connect circuit 119 is caused to transfer the information to path 130 by control signals on path 114. Control signals and command information (on path 112) cause algorithm block 120 to input and process (encrypt or decrypt) the information. Upon completion of the processing, algorithm block 120 sends a control signal to Control circuit 104 via path 114 indicating that the processing of the particular block of information has been completed. Algorithm block 120 also places the processed information on path 138. Cross connect circuit 128 transfers (based on control signals on path 114) the processed block of information on path 138 to one of L lines of path 118. The amount of information processed by the algorithm blocks is controlled by command information and how the information is formatted in input storage 102A. The processed information on one of the L lines of path 118 is placed in output storage 102C in a format similar to or different than the format of input storage 102A.

I claim:
1. A cipher device for applying cryptographic processing to information received from a source to generate processed information, the cipher device comprising:
   (a) an interface circuit configured to receive the information from the source and having L output lines and L input lines;
   (b) a configurable cipher block comprising:
      (1) a programmable input cross connect circuit having L input lines and N output lines, where N is an integer greater than 1;
      (2) N algorithm blocks, each having an input line and an output line; and
      (3) a programmable output cross connect circuit having N input lines and L output lines; and
   (c) a control circuit coupled to the interface circuit and the configurable cipher block, wherein:
      the L output lines of the interface circuit are coupled to the L input lines of the input cross connect circuit;
      the input line of each algorithm block is connected to a different output line of the input cross connect circuit;
      the output line of each algorithm block is connected to a different input line of the output cross connect circuit;
      the L output lines of the output cross connect circuit are coupled to the L input lines of the interface circuit; and
      the control circuit is configured to:
         (i) load two or more different cryptographic algorithms into any two or more of the N algorithm blocks;
         (ii) program the input cross connect circuit to connect any one or more of its L input lines to any one or more of its N output lines; and
         (iii) program the output cross connect circuit to connect any one or more of its N input lines to any one or more of its L output lines.

2. The invention of claim 1, wherein the interface circuit is configured to transmit two or more different subsets of the information received from the source over two or more of the L output lines of the interface circuit.

3. The invention of claim 2, wherein the control circuit is configured to program the interface circuit to divide the information received from the source into any number of subsets from 2 to L.

4. The invention of claim 1, wherein the configurable cipher block simultaneously performs two or more different cryptographic algorithms on two or more different subsets of the information received from the source.

5. The invention of claim 1, wherein the interface circuit comprises input storage and output storage, wherein information received by the interface circuit is stored in the input storage and transferred to the configurable cipher block which performs cryptographic processing on such information and outputs processed information which is stored in the output storage.

6. In a cipher device, a method for applying cryptographic processing to information received from a source to generate processed information, the method comprising the steps of:
   (i) configuring the cipher device, wherein the cipher device comprises:
      (a) an interface circuit configured to receive the information from the source and having L output lines and L input lines;

(b) a configurable cipher block comprising:
  (1) a programmable input cross connect circuit having L input lines and N output lines, where N is an integer greater than 1;
  (2) N algorithm blocks, each having an input line and an output line; and
  (3) a programmable output cross connect circuit having N input lines and L output lines; and
(c) a control circuit coupled to the interface circuit and the configurable cipher block, wherein:
  the L output lines of the interface circuit are coupled to the L input lines of the input cross connect circuit;
  the input line of each algorithm block is connected to a different output line of the input cross connect circuit;
  the output line of each algorithm block is connected to a different input line of the output cross connect circuit;
  the L output lines of the output cross connect circuit are coupled to the L input lines of the interface circuit; and
  configuring the cipher device comprises the control circuit:
    (A) loading two or more different cryptographic algorithms into any two or more of the N algorithm blocks;
    (B) programming the input cross connect circuit to connect any one or more of its L input lines to any one or more of its N output lines; and
    (C) programming the output cross connect circuit to connect any one or more of its N input lines to any one or more of its L output lines; and
(ii) receiving the information from the source at the interface circuit;
(iii) transmitting the information from the interface circuit to the input cross connect circuit;
(iv) routing the information through the input cross connect circuit to the algorithm blocks;
(v) applying the two or more different cryptographic algorithms loaded into the two or more algorithm blocks to the information to generate the processed information;
(vi) transmitting the processed information from the algorithm blocks to the output cross connect circuit;
(v) routing the processed information through the output cross connect circuit to the interface device; and
(vi) transmitting the processed information from the interface device.

7. The invention of claim 6, wherein the interface circuit transmits two or more different subsets of the information received from the source over two or more of the L output lines of the interface circuit.

8. The invention of claim 7, wherein the control circuit is configured to program the interface circuit to divide the information received from the source into any number of subsets from 2 to L.

9. The invention of claim 6, wherein the configurable cipher block simultaneously performs two or more different cryptographic algorithms on two or more different subsets of the information received from the source.

10. The invention of claim 6, wherein the interface circuit comprises input storage and output storage, wherein information received by the interface circuit is stored in the input storage and transferred to the configurable cipher block which performs cryptographic processing on such information and outputs processed information which is stored in the output storage.

* * * * *